Oct. 30, 1962  D. A. NOBLE  3,060,494
FOOD MOLD
Filed June 1, 1961
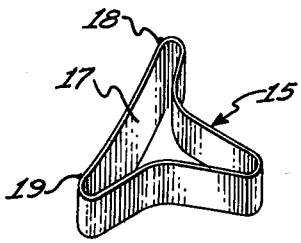
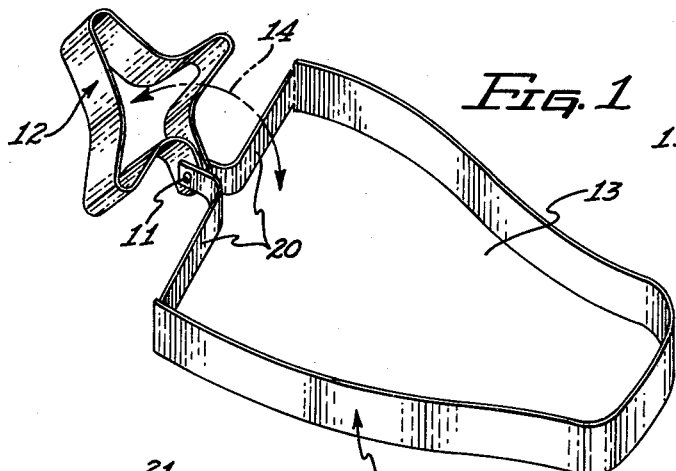
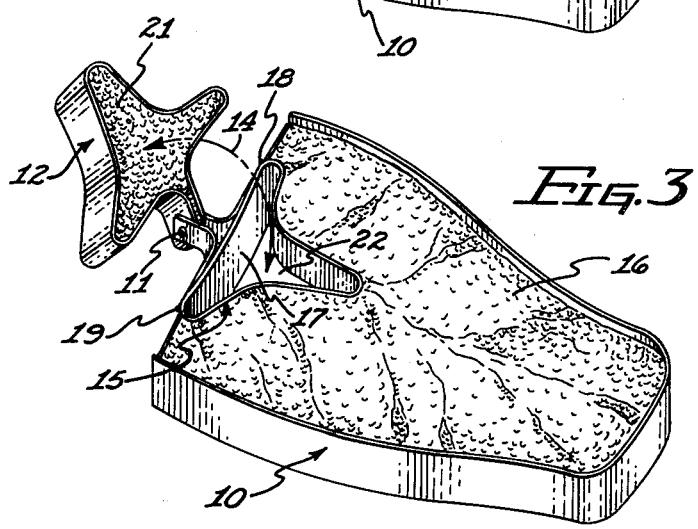
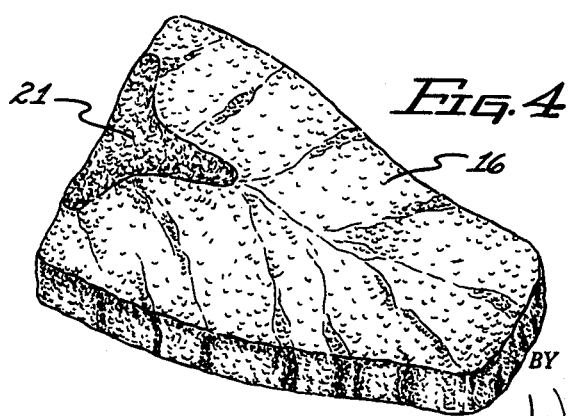
INVENTOR.
DAVID A. NOBLE.
BY Willard S. Grout
ATTORNEY.

United States Patent Office 3,060,494
Patented Oct. 30, 1962

---

3,060,494
FOOD MOLD
David A. Noble, 7330 Shea Blvd., Phoenix, Ariz.
Filed June 1, 1961, Ser. No. 114,189
1 Claim. (Cl. 17—32)

This invention pertains to a method and apparatus for food molding and is particularly directed to a method and apparatus for preparing a simulated T-bone steak from various food materials.

This application is a continuation-in-part application of my application serial number 821,586, filed June 19, 1959, now abandoned.

One of the objects of this invention is to provide a simplified form for making up and cooking a simulated T-bone steak of various different food materials.

Another object of this invention is to provide a simplified form for making up a simulated T-bone steak of various food materials which is easy to produce and sanitary in application.

Still another object is to provide a simulated T-bone steak form comprising a main form for the exterior edge of the simulated steak and two T-bone forming forms, one detached from the main frame and the other hinged to the main frame to provide a sequential cooking of the steak portion and bone portion of the simulated steak ingredients.

Further features and advantages of this invention will appear from a detailed description of the drawings in which:

FIG. 1 is a perspective view of a steak mold showing the main form and the hinged T-bone form.

FIG. 2 is a perspective view of the supplemental T-bone form.

FIG. 3 is a view similar to FIG. 1 showing the steak portion being cooked prior to the T-bone portion being moved into cooking position.

FIG. 4 is a perspective view of the completed simulated T-bone steak.

As an example of one embodiment of this invention there is shown a food mold having a main outside mold element 10 partaking of the shape of an exterior of a T-bone steak. Pivotally mounted on a pin 11 at the rib portion of the main mold 10 is the swinging bone material holding form 12 adapted to swing about the pin 11 in a vertical plane to and from the mold chamber 13 in the direction indicated by the arcuate line of swinging 14.

In the use of the device a supplemental T-bone form 15 is placed in the chamber 13 of the main mold 10 and the steak simulating material 16 placed inside the main mold and around the outside of the supplemental mold 15 as shown in FIG. 3. The supplemental mold 15 has its rib portion 17 between the points 18 and 19 abutting against the inside of the rib portion 20 of the main mold element 10. The bone holding form 12 is swung up and back and is filled with the bone simulating material 21.

The device thus loaded is then placed on a hot plate or grille and the steak simulating material initially cooked. The supplemental T-bone form is then removed and the swinging bone holding form 12 with its contents 21 is swung down into the cavity 22 formed in the steak simulating material by the supplemental form. The material 21 is then held and the form 12 swung up out of the main form, leaving the bone simulating material 21 in the cavity in contact with the steak simulating material 16. The composite material is then finish cooked as required. Thus, the two materials 16 and 21 may be readily sequential cooked and for different lengths of time to provide a simulated steak structure with each ingredient receiving its proper cooking time.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention what is claimed and desired to be obtained by United States Letters patent is:

A food mold comprising in combination:
(a) a main outside mold element including a rib portion and having the shape of an exterior edge of a T-bone steak,
(b) a bone material holding form,
(c) and a horizontal pivot pin, fixed on outward horizontally extending portions of said rib portion of said main outside mold element, adapted to pivotally support said bone material holding form for vertical swinging to and from a position within said main outside mold element adjacent the inside of said rib portion.

References Cited in the file of this patent

UNITED STATES PATENTS

| | | |
|---|---|---|
| 1,849,457 | Johns | Mar. 15, 1932 |
| 2,015,097 | Bowman et al. | Sept. 24, 1935 |
| 2,081,080 | Baker | May 18, 1937 |
| 2,484,460 | Pedro | Oct. 11, 1949 |
| 2,529,354 | Schroder | Nov. 7, 1950 |
| 2,746,402 | Baxter | May 22, 1956 |
| 2,779,681 | Sell et al. | Jan. 29, 1957 |
| 2,937,095 | Zitin | May 17, 1960 |